United States Patent

[11] 3,554,294

| [72] | Inventors | James Morkoski<br>Clarendon Hills;<br>Louis B. Garriott, Jr., Downers Grove, Ill. |
|---|---|---|
| [21] | Appl. No. | 633,132 |
| [22] | Filed | Apr. 24, 1967 |
| [45] | Patented | Jan. 12, 1971 |
| [73] | Assignee | International Harvester Company<br>Chicago, Ill.<br>a corporation of Delaware |

[54] REVERSING MECHANISM FOR TWO-WAY PLOWS
9 Claims, 7 Drawing Figs.

[52] U.S. Cl. .................................................... 172/223,
16/139, 172/225
[51] Int. Cl. ....................................................... A01b 3/34
[50] Field of Search .......................................... 172/225,
226, 227; 292/238, 263, 278; 16/49, 50, 138;
217/60; 16/146

[56]  References Cited
UNITED STATES PATENTS

| 2,473,624 | 6/1949 | Weyenberg et al | 217/60 |
| 3,428,135 | 2/1969 | Richey | 172/225 |
| 2,542,403 | 2/1951 | Engstrom | 16/146UX |
| 3,311,176 | 3/1967 | Cleland | 172/225 |
| 3,386,518 | 6/1968 | Mellen | 172/225 |

*Primary Examiner*—Robert E. Bagwill
*Attorney*—Noel G. Artman

ABSTRACT: A two-way plow has a plow carrier swingable approximately 180° about a longitudinal axis through a central or dead center position between right- and left-hand plowing positions. Reversal is accomplished with a hydraulic cylinder which swings with the plow carrier on the retraction stroke through the dead center position to an overcenter position where it is locked to prevent the carrier from being bounced backward overcenter in the other direction until the cylinder fluid is reversed to extend the cylinder and continue the rotation of the plow carrier to its alternate plowing position.

INVENTORS
JAMES MORKOSKI
LOUIS B. GARRIOTT, JR.

ATTY

INVENTORS
JAMES MORKOSKI
LOUIS B. GARRIOTT, JR

*JK McNeill*
ATTY

INVENTORS
JAMES MORKOSKI
LOUIS B GARRIOTT, JR.

ATTY

REVERSING MECHANISM FOR TWO-WAY PLOWS

This invention relates to agricultural implements and particularly to plows. More specifically the invention concerns reversing mechanism for two-way plows.

In a two-way plow of the type wherein the plow carrier is mounted on a support for rotation about an axis extending in the direction of travel and a hydraulic cylinder is pivotally anchored at one end to the support and at its other end to the carrier and swings about its pivot on its retracting stroke to revolve the plow carrier to a centered position with respect to the carrier from one operating position and on its extension stroke to continue to revolve the carrier to its alternate operating position, the carrier may rebound in the wrong direction from the centered position so that upon the cylinder extension stroke the plow carrier will be returned to its original plowing position.

The present invention overcomes this disadvantage in plows of this type and has for its object the provision of novel reversing mechanism for a two-way plow.

Another object of the invention is the provision, in a two-way plow, reversible by a single hydraulic cylinder utilizing one of its strokes to revolve the plow carrier part way from one of its operating positions and the other of its strokes to continue rotation of the plow to its alternate operating position, of novel means for revolving the plow carrier by said one of its strokes overcenter with respect to a median between the carrier's operating positions to insure that said other stroke of the cylinder moves the carrier to said alternate operating position.

Another object of the invention is the provision, in a two-way plow of the type described wherein the plow carrier is thrown to an overcenter position by a hydraulic cylinder on its retracting stroke with respect to a median between the right- and left-hand operating positions of the plow and is locked in that position until the extension stroke of the cylinder is actuated.

Other objects and advantages of the invention will become clear from the following detailed description when read in conjunction with the accompanying drawings, wherein.

Figure 1:
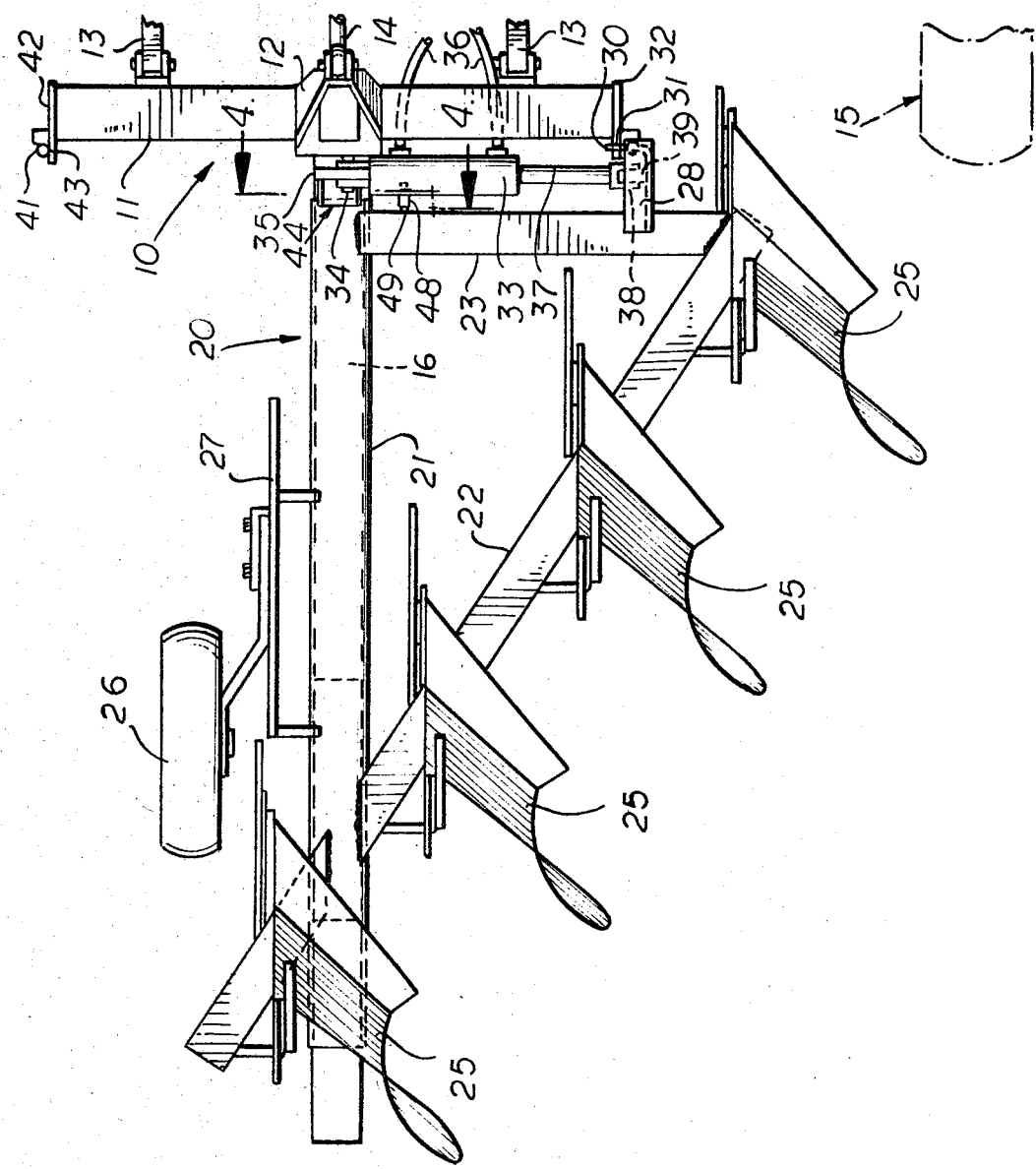
FIG. 1 is a plan view of a two-way, rollover moldboard plow having power operated reversing mechanism incorporating the features of this invention.

In the drawings the two-way plow of this invention is shown as comprising a relatively stationary frame 10 having a forward transverse member 11 to which is secured a central upwardly extending mast 12, member 11 being pivotally connected to the laterally spaced lower links 13, and mast 12 being pivotally connected to the upper link 14 of a conventional three-point hitch carried by a tractor 15 having the usual source of fluid under pressure and power lift means adapted to raise and lower the three-point hitch links.

Also forming a part of the frame 10 is a tubular member 16 secured to the central portion of and extending rearwardly from the transverse crossbeam 11.

The plow carrier 20 comprises a central longitudinally extending tubular pivot section 21 rotatably mounted on member 16 and a diagonal backbone 22, rectangular in section, affixed, as by welding, to the rear portion of pivot section 21 and having its forward end connected to the central pivot section by a transverse bar 23, generally parallel to frame member 11 in the operating positions of the plow.

Right- and left-hand moldboard plow units 24 and 25, respectively, secured to the ends of plow beams 26 are mounted on backbone 22 at spaced locations and a gauge wheel 26' is adjustably mounted by means diagrammatically indicated in FIG. 1 on a bracket 27 secured to the central tubular section 21 of the carrier.

Figure 2:
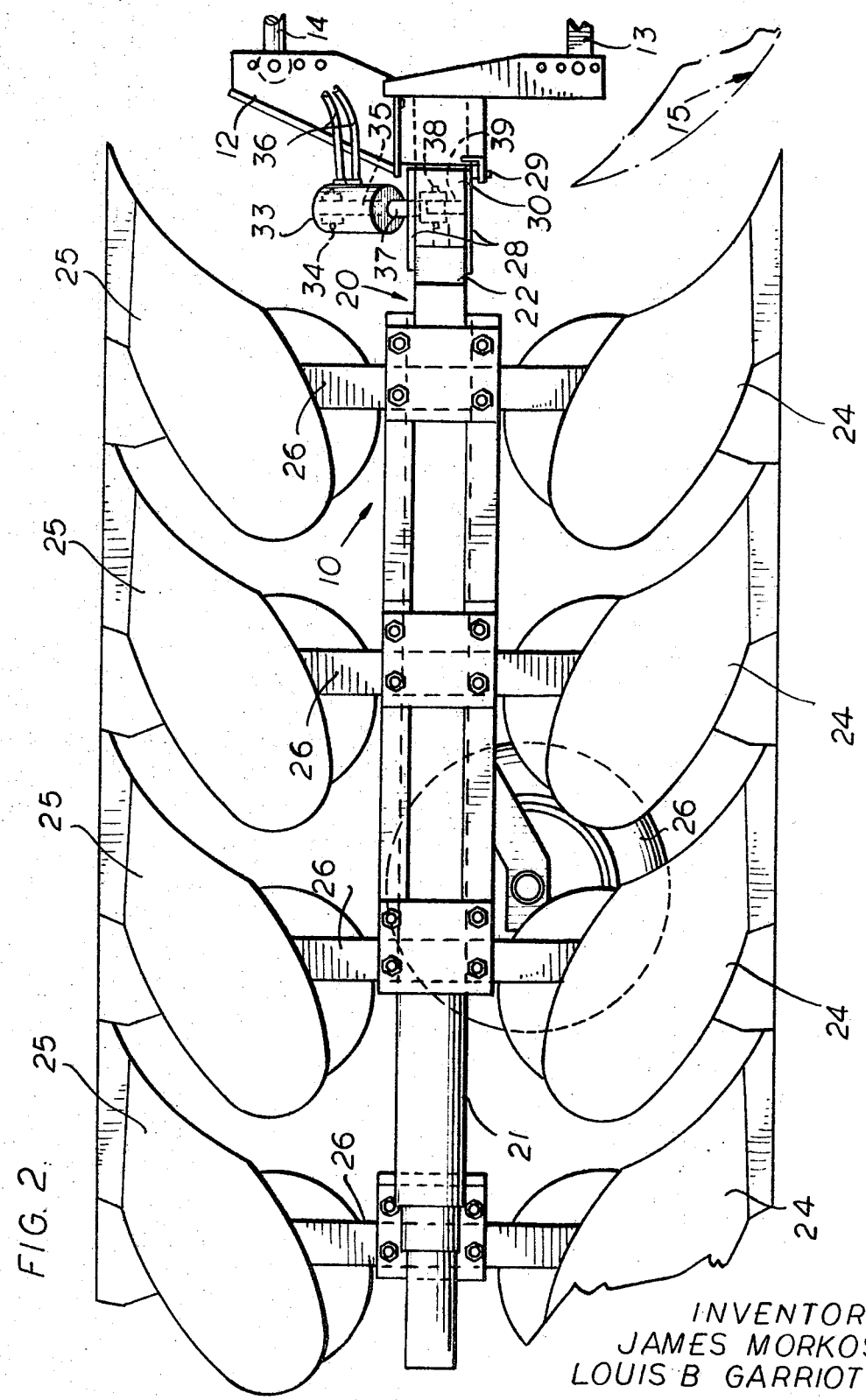
FIG. 2 is an enlarged view in side elevation of a portion of the plow as shown in FIG. 1.
Figure 3:
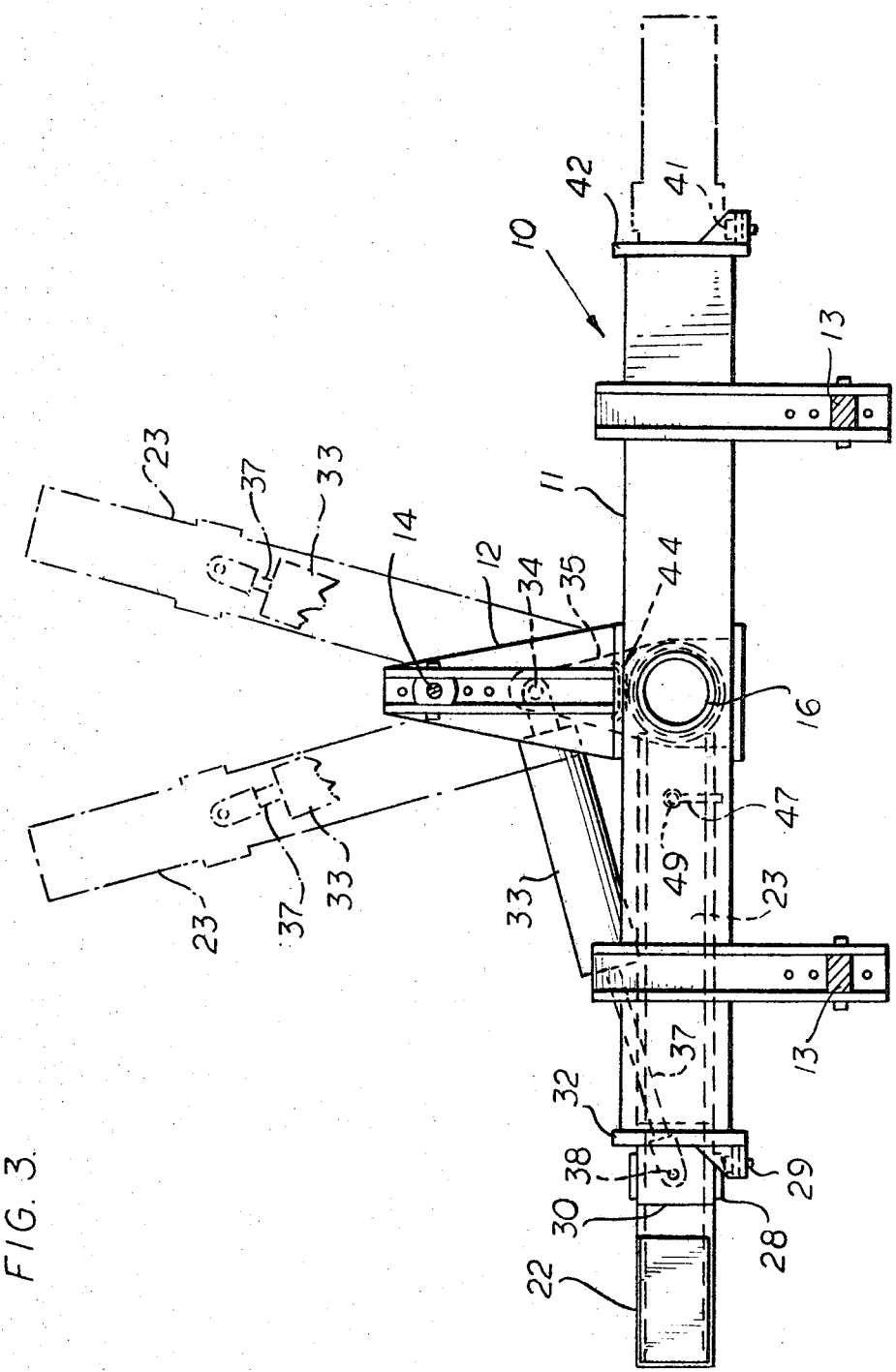
FIG. 3 is a sectional view from the front of a portion of the structure shown in FIGS. 1 and 2.

The position of the parts shown in FIGS. 1 to 3 is for operation of the right-hand plow units 24. Vertically spaced plates forming an arm 28 are affixed to and project forwardly from the outer portion of bar 23 and engage an adjustable stop in the form of a pin 29 carried by a plate 32 covering the end of cross member 11, the vertically spaced elements of arm 28 confining an angle bar 30, one flange of which is seated in a notch 31 forming an extension of a plate 32.

It may be understood that the tractor 15 is provided with well-known hydraulic power transmission means, not shown, connected to the three-point hitch links 13 and 14 for raising and lowering the implement. It may also be understood that suitable valve means is provided on the tractor within reach of the tractor operator for controlling the raising and lowering of the implement.

The plow carrier 20 is revolved about the axis of member 16 to alternate the right-hand plow units 24 with the left-hand plow units 25 by operation of a hydraulic cylinder 33. Cylinder 33 is pivotally anchored by a pin 34 to the upper end of a standard 35 affixed to member 16, and is supplied with fluid under pressure through hose lines 36 by operation of the tractor control valve, to extend or retract piston rod 37 in cylinder 33. Piston rod 37 is pivotally connected by a pin 38 to a lug 39 affixed to angle bar 30.

From the right-hand operating position shown in FIGS. 1 to 3, piston rod 37 is retracted in cylinder 33 to swing the tool carrier about the axis of its central section in a clockwise direction, as viewed in FIG. 3. Also, as indicated in dotted lines in FIG. 3, piston rod 37 is fully retracted in the cylinder at approximately 12° before a dead center position of the cylinder and the carrier is reached with respect to the axis of pivot pin 34 and of member 16.

In order to dispose the plow carrier 20 in a position to insure that, upon a subsequent extension stroke of piston rod 37 in cylinder 33, the plow carrier will be swung clockwise to its left-hand plowing position, the opening 40 in the upper end of standard 35 is larger than pivot pin 34, forming a lost-motion connection of cylinder 33 with standard 35 permitting the momentum of the plow carrier generated by retracting cylinder 33 to throw the plow carrier over the dead center position and approximately 12° beyond to the right-hand dotted line position of FIG. 3.

In the clockwise overcenter position of FIG. 3, continued clockwise movement of the carrier is prevented by the cylinder 33, in which the fluid is locked, until the tractor operator manipulates his control valve to supply fluid under pressure to the cylinder to again extend the piston rod 37 therein. The plow carrier continues to revolve clockwise until arm 28 engages an adjustable stop in the form of a pin 41 carried by a plate 42, angle bar 30 being seated in a notch 43 provided in a rearward extension of plate 42 covering the end of crossbeam 11.

In the overcenter position of FIG. 3 referred to, the plow carrier is prevented from rebounding in a counterclockwise direction by the provision of one-way latch means comprising a trough-shaped stationary latch part 44 having upwardly inclined sides 45 and 46 forming abutments or stops engageable by a pendulous latch dog 47 depending from and having a bearing portion 48 to pivotally receive a pin 49 secured to and projecting forwardly from laterally extending bar 23 near its inner end.

Figure 4:
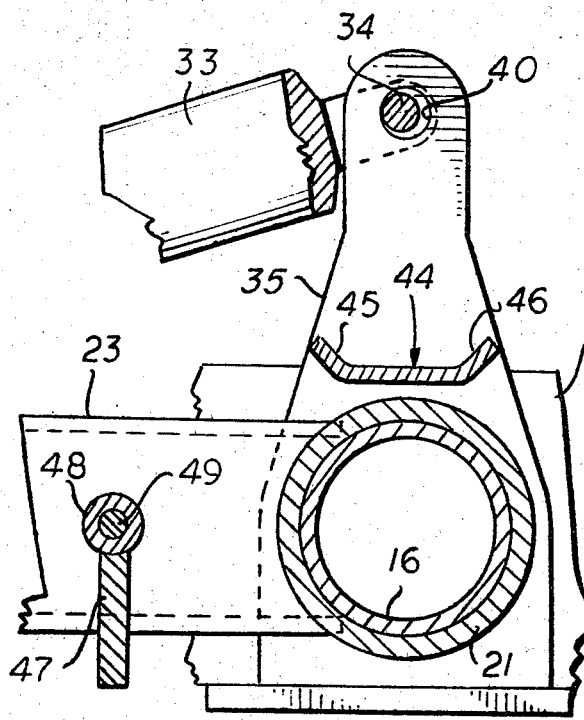
FIG. 4 is an enlarged section taken on the line 4—4 of FIG. 1, showing the position of certain of the parts when the plow is in position for right-hand operation.
Figure 5:
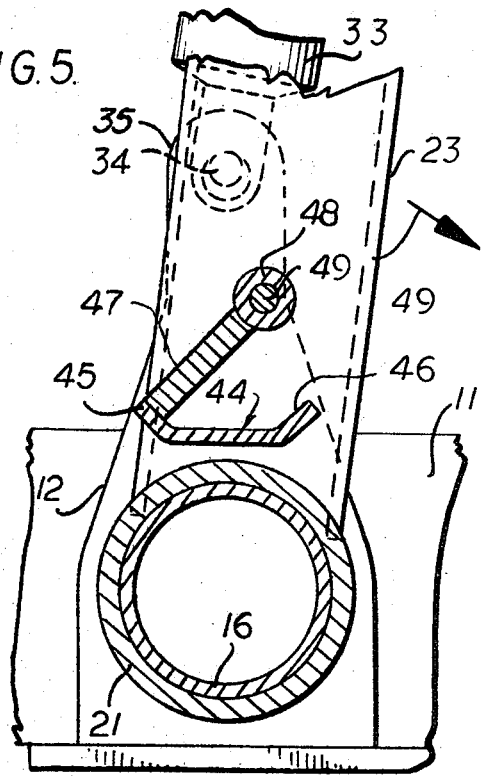
FIG. 5 is a view similar to FIG. 4 showing the position of the parts when the plow carrier has executed a partial revolution.
Figure 6:
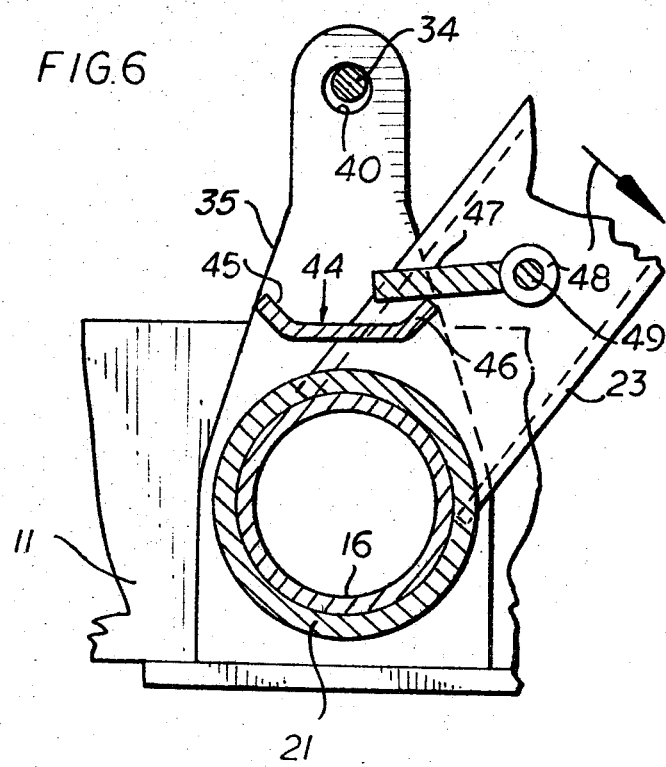
FIG. 6 is a view similar to FIGS. 4 and 5 showing the operation of the one-way latch which prevents the carrier from rebounding in the direction from which it was revolved by the initial reversing stroke of the cylinder.
Figure 7:
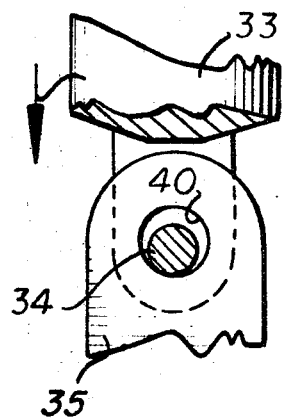
FIG. 7 is a sectional detail showing the dead center position of the hydraulic cylinder as it passes through on the way to its overcenter position.

As shown in FIG. 4, latch part or dog 47 having a collar 48, depends vertically from pin 49 in the operating position of the plow. As the bar 23 of the plow carrier is revolved clockwise from the position of FIG. 4, latch part 47 first engages side 45 of stationary latch part 44. As the carrier continues rotation overcenter, by virtue of its momentum and the oversize opening 40 receiving pin 34, latch dog 47 abuts inclined side 45 in the manner shown in FIG. 5 to hold the tool carrier 20 and prevent its reverting to a counterclockwise rotation. As shown in FIG. 6, latch dog 47 offers no resistance to rotation of the carrier to the left-hand plowing position, simply riding over the inclined side 46 of latch part 44. The cylinder 33 is extended until left-hand plow units 25 are in position for left-hand plowing.

To again return the alternately operating right-hand plow units 24 to their operating position the reverse of the foregoing procedure is followed. Retraction of piston rod 37 in cylinder 33 swings the plow carrier counterclockwise through the top dead center position to the dotted line position shown at the left in FIG. 3, at which point the pivoted latch part 47 engages abutment 46 to prevent rebounding of the carrier in a clockwise direction. Reversing of the control valve on the tractor then supplies fluid under pressure to cylinder 33 to extend the piston rod and swing the plow carrier to the right-hand position, cylinder 33 swinging with the carrier about its pivot 34.

It is believed that the construction and operation of the novel two-way plow reversing mechanism of this invention will be clearly understood from the foregoing description. It should likewise be understood that the invention has been described in its preferred embodiment and that modifications may be made therein without departing from the spirit of the invention or the scope of the appended claims.

We claim:

1. In a two-way plow having a relatively stationary frame pivotally supporting a plow carrier for movement about a longitudinal axis between right-hand and left-hand plowing positions, means for pivotally moving said plow carrier alternately from one of said positions to the other comprising a fluid-operated ram pivotally connected at one end to said frame and pivotally connected at the other end to said carrier in operative relation, said carrier being movable in one direction from one of its plowing positions through a central zone adjacent to a vertical plane coincidental with said axis to an overcenter attitude in response to the operation of said ram in one direction, and latch means on said frame and said carrier operable reactively when said carrier is moved into said central zone and positioned to preclude retrograde movement of said carrier from said zone.

2. The invention set forth in claim 1 wherein said latch means includes a component disposed on said frame and a component disposed on said carrier positioned for engagement when the carrier is moved into said central zone.

3. The invention set forth in claim 2 wherein said component disposed on said frame includes abutment means and said component disposed on the carrier includes a latch member in the form of a pendant pivotally mounted on said carrier and positioned for engagement with said abutment means when said carrier is moved to said overcenter attitude whereby retrograde movement of said carrier is precluded, and said pendant being pivotally movable to accommodate movement of said carrier unrestrictively to its other plowing position.

4. The invention set forth in claim 1 wherein the pivotal connection of said ram to said frame includes a pin carried by said ram positioned in an oversize opening disposed in said frame to provide a lost-motion means between said ram and said frame to permit said carrier to move into said overcenter attitude during operation of said ram in said one direction.

5. The invention set forth in claim 4 wherein said ram is completely retracted during movement of said carrier in said central zone and the lost-motion means of said pin in said oversize opening permits the momentum of the carrier to move the carrier to said overcenter attitude.

6. In a two-way plow having a relatively stationary frame pivotally supporting a plow carrier for movement about a longitudinal axis between right-hand and left-hand plowing positions, power operated means for pivotally moving said plow carrier alternately from one of said positions to the other through a central zone adjacent to a vertical plane coincidental with said axis to an overcenter attitude, and means disposed on said frame and said carrier positioned to preclude retrograde movement of said carrier when said carrier is moved to said overcenter attitude.

7. The invention set forth in claim 6 wherein the said power-operated means for pivotally moving said plow carrier is a fluid-operated ram pivotally connected at one end to said frame and pivotally connected at the other end to said carrier, said ram being fully retracted when said carrier is moved into said central zone, one of said pivotal connections of said ram having lost-motion means to accommodate movement of the carrier by momentum thereof through said central zone to said overcenter attitude.

8. The invention set forth in claim 7 wherein said means to preclude retrograde movement of said carrier when said carrier is moved to said overcenter attitude is a latch mechanism disposed on said frame and said carrier adapted for engagement when said carrier moves to said overcenter attitude.

9. The invention set forth in claim 8 wherein said latch mechanism comprises stationary abutment means disposed on said frame and a freely swingable latch dog pivotally mounted on and depending downwardly from said carrier throughout the range of movement of said carrier from one of said plowing positions to the other, said latch dog being deflectable by said abutment means during movement of the carrier in a direction from one of its plowing positions to the other and engageable with said abutment means at said overcenter attitude in said central zone to prevent retrograde movement of said carrier.